May 25, 1943.  E. I. BAILEY  2,320,059
APPARATUS FOR TREATING OIL
Original Filed Sept. 14, 1938
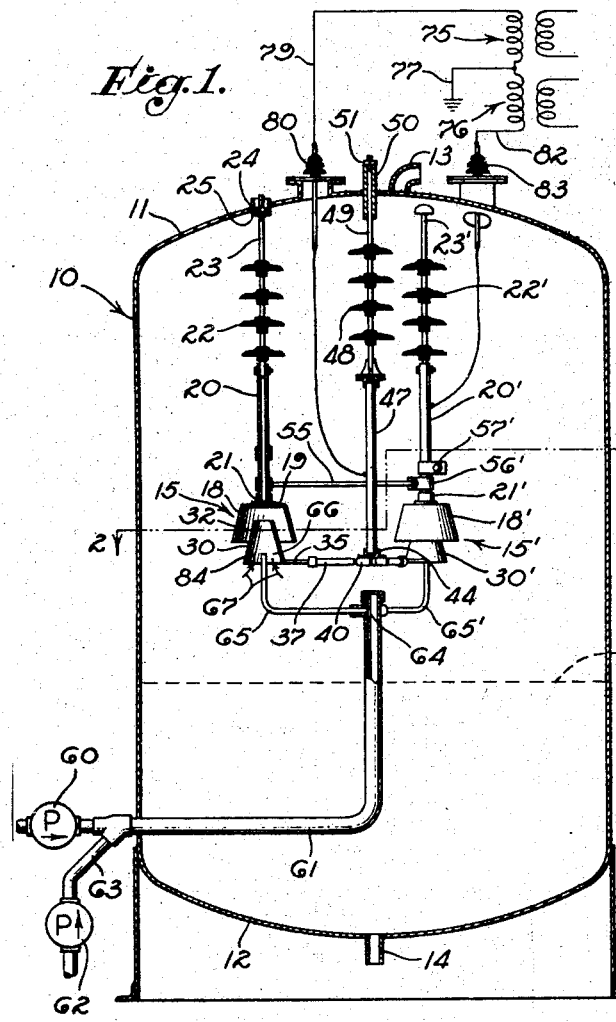
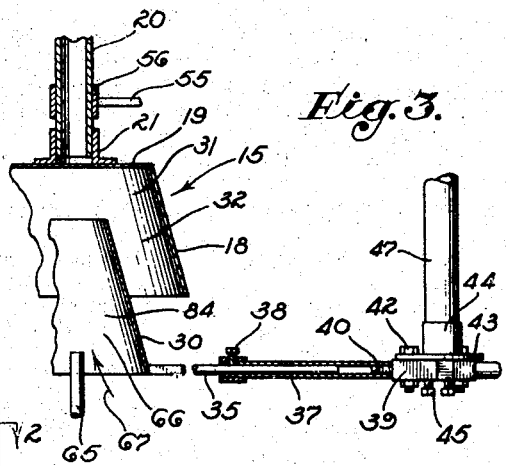
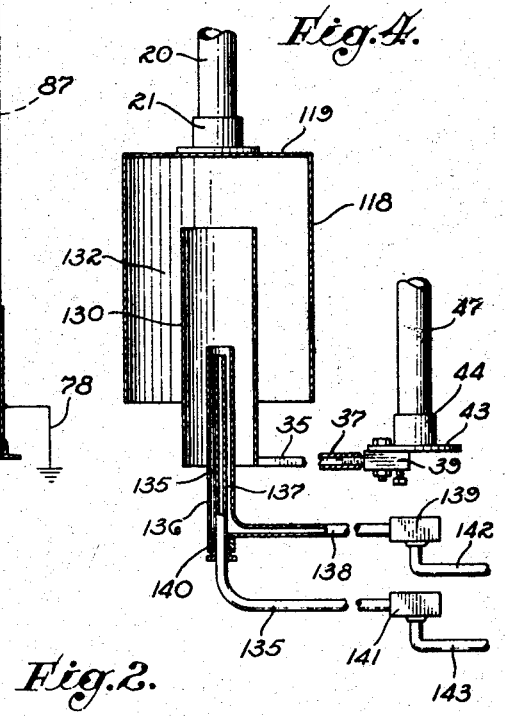
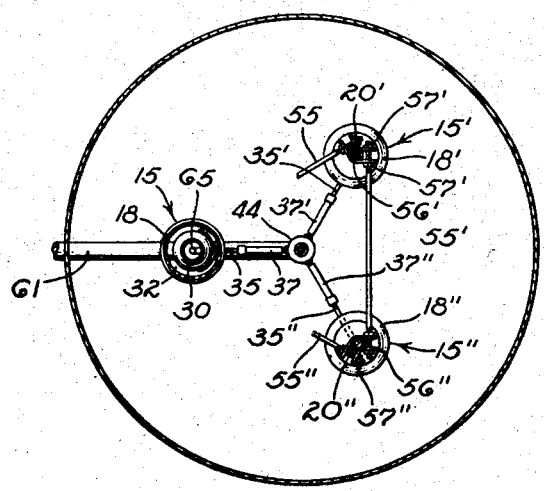
INVENTOR
EDMUND I. BAILEY
BY
HARRIS, KIECH, FOSTER & HARRIS
*Clarence F. Kiech*
FOR THE FIRM
ATTORNEYS Patented May 25, 1943

2,320,059

UNITED STATES PATENT OFFICE 2,320,059

APPARATUS FOR TREATING OIL

Edmund I. Bailey, Toledo, Ohio, assignor to Petrolite Corporation, Ltd., Wilmington, Del., a corporation of Delaware Original application September 14, 1938, Serial No. 229,933. Divided and this application April 30, 1940, Serial No. 332,491

14 Claims. (Cl. 204—304)

My invention relates to a novel apparatus for electrically treating mixtures or emulsions and, more particularly, to a novel apparatus in which a mixing action is imparted to the constituents in an electric field, whereby mixing and coalescing tendencies are present in the same zone.

The invention is particularly useful in removing dispersed impurity-containing water droplets from an oil of sufficient resistivity as to permit establishment of an electric field therein. Most commonly, the invention is employed with reference to the treatment of a mineral oil and will be particularly described with reference to the removal of impurity-containing water droplets from a crude oil.

Most crude oils, as produced from the earth in the form of an emulsion, contain water in varying amounts, depending upon location and conditions of production. Most crude oil emulsions contain from 10% to 50% of water. To be commercially salable, such a crude oil is conventionally dehydrated by various known methods to reduce the water content to a value which is usually below 3%. The apparatus of the present invention can be used both in such dehydration and in an electrical purification process which will now be described.

This purification process has for its object the removing of the dispersed impurity-containing water droplets from an oil, and the process usually receives for treatment a dehydrated oil such as mentioned above. In this process, the incoming oil should preferably be of low water content and best results are obtained if the water content does not exceed 2% or 3%, though it is possible to obtain some beneficial results and remove some of the impurity-containing water droplets if up to about 8% or 10% of water is present. Usually, however, I prefer to start the purification process where dehydration processes end, though it will be clear that the oil to be treated need not result from a previous dehydration step as the purification process is applicable to various oils of low water content, whether naturally produced in this state or whether obtained by blending various crudes. The purification process is also applicable to topped oils or to fractions obtained from an oil, and the term "mineral oil" is used to cover all such materials.

The water present in a crude oil emulsion contains various associated impurities. This water is usually a brine containing various salts of which magnesium chloride, calcium chloride, and sodium chloride may be cited as examples. Various other materials may be present as impurities in such brine, for example, silt and chemicals which may be present due to chemical treatment of the wells, e. g., acids due to acid treatment of oil wells.

Dehydration of a crude oil emulsion will often remove the impurity-containing water in large measure. However, in many instances, the resulting dehydrated oil still contains impurities in such amount as to result in deleterious corrosion and clogging actions when the oil is subsequently refined. By way of example, oils are often encountered which contain not more than one-half of 1% of dispersed water but in which the salt content is several hundred grams per barrel of oil.

Such dispersed brine droplets can be removed from the oil and, in some instances, can be predominantly replaced by other droplets containing less or none of the impurities, by mixing a relatively fresh water with the oil in such manner as to produce a mixture in which the impurity-containing water droplets coexist with the relatively fresh water droplets, this mixture being then subjected to the action of an electric field of sufficient intensity to coalesce the coexisting droplets. By the term "relatively fresh water" as herein used, I have reference to water which contains substantially less of the impurities than do the originally-present impurity-containing water droplets of the oil. Distilled water is not essential and ordinary fresh water, such as is obtainable from sources used for drinking purposes, will give excellent results. This term is thus not limited to a pure water containing no minerals or chemicals and includes water which may contain, or to which may be added, various chemicals to assist in the purification process. However, if the impurity content of the oil is to be reduced by the process, it is essential that this relatively fresh water should not be contaminated with impurities to the same extent as the original water droplets to be removed, for the purification process acts, in effect, to replace these original water droplets with droplets of the added relatively fresh water.

The present invention is particularly useful in those situations where the incoming oil contains emulsifying agents in such amount, or of such nature, that the usually-applied mixing action designed to mix the oil with the relatively fresh water will form a mixture or emulsion which is difficult or impossible of electric resolution. Considerable difficulty has been encountered in treating certain oils if this mixing takes place outside the electric treater at a considerable distance from the electric field, it having been found that the action of the electric field will be slow and the treater cannot be operated with high throughputs.

In the present invention, it has been found that the purification of such oils, and many other oils, is improved by delaying the ultimate mixing of the oil and relatively fresh water until these materials are in a treating zone in which an electric field is established which is of such character as to exert a coalescing action on the water droplets.

It is an object of the present invention to remove impurity-containing water droplets from an oil by delivering to a treating zone proportioned quantities of this oil and relatively fresh water and mixing same while under the influence of an electric field established in this treating zone. I am unable to explain with certainty the exact reasons for the improved treatment but it has been established that the simultaneous presence of a mixing action and an electric coalescing action is beneficial in these instances. Tests also indicate that certain artificial mixtures formed by such oils and relatively fresh water will age rapidly, and that the effectiveness of electric treatment decreases as the mixture ages. Such aging of the mixture depends both upon chronological and absorption conditions.

It is an object of the present invention to provide a system for producing an electrically-treatable water-in-oil mixture in the presence of an electric field, particularly in those instances where such a mixture has a fast-aging characteristic.

Another object of the invention is to provide a system for mixing the oil and the relatively fresh water by inducing a turbulence in the electric field into which these constituents are introduced.

Another object of the invention is to provide a system in which the mixing of such materials in an electric field is facilitated by vibrating one or both of the electrodes.

Still another object of the invention is to provide an apparatus for recycling into the field a portion of the electrically-treated constituents discharging therefrom, whereby the recycled constituents are mixed with the incoming oil and relatively fresh water.

Another object of the invention is to provide a novel means in which mingling of the oil with the relatively fresh water takes place at a point spaced from the field, the ultimate mixture to be electrically treated being produced by inducing a mixing action in the field itself, as distinct from producing this ultimate mixture at a position spaced a substantial distance from the field. If the constituents are of such nature that the mingling action will produce a preliminary mixture which ages rapidly, and if the subsequent mixing in the electric field is not sufficiently effective, through formation of new interfaces, to produce a resulting mixture readily susceptible of electric treatment, I find it expedient to deliver the oil and the relatively fresh water as separate streams to a zone adjacent the electric field, thereby permitting substantially the entire mixing action to be effected while the materials are under the influence of an electric field. It is another object of the invention to provide a novel apparatus for producing this result.

Another object of the invention is to provide an apparatus adapted to discharge oil and relatively fresh water in proportioned amounts into an auxiliary field, which is preferably of lower gradient than the main field, after which these constituents move into the zone of influence of the main field, the apparatus inducing such mixing action in one or both fields as will produce the ultimate mixture desired in the process.

Other objects and advantages of the invention reside in the general construction of the apparatus used, and the invention includes among its objects the provision of a multiple electrode system in which fields are established both between the electrodes and between one of the electrodes and the means which discharges into the field. Another object is to provide an apparatus including concentric electrodes, the outer of which is substantially closed at a position spaced from the inner electrode, and to direct the constituents into this inner electrode to flow toward the closed end of the outer electrode.

Further objects and advantages of the invention will be made evident hereinafter.

Referring to the drawing:

Figure 1 is a vertical sectional view of an electric treater of the invention by use of which the process can be performed.

Figure 2 is a horizontal sectional view taken as indicated by the line 2—2 of Figure 1.

Figure 3 is an enlarged detail, partially in section, of the support for the inner electrodes.

Figure 4 is an enlarged diagrammatic view, partially in section, showing an alternative form of the invention.

Referring particularly to Figure 1, there is shown a tank or container 10 including upper and lower walls 11 and 12, this tank providing a chamber containing oil and water constituents undergoing gravitational separation. Provision is made for withdrawing oil from the upper end of the tank 10 through a pipe 13, and for withdrawing water from the lower end of the tank through a pipe 14 in such manner that superatmospheric pressure can be maintained inside the tank, if desired.

Submerged in a portion of the liquid in the tank 10, which is of sufficient resistivity to permit maintenance of an electric field, is one or more treating units. In the present treater, three treating units are shown, indicated respectively by the numerals 15, 15' and 15", these units being substantially duplicates. Description of the treating unit 15 will suffice to show the construction of the remaining units in which corresponding elements are indicated by primed numbers.

The treating unit 15 includes an outer electrode 18 in the form of an inverted cup which comprises a side wall partially or completely closed at its upper end by a deflecting or closure means, shown as being in the form of a plate 19. As shown, this outer electrode 18 diverges slightly in a downward direction so as to be of frustoconical form. A supporting means is provided therefor and includes a support 20 which may be in the form of a pipe connected to the plate 19 by a flange 21. The upper end of the support 20 is suspended from a string of insulators 22 which are, in turn, suspended on a rod 23 which is vertically adjustable at the point where it passes through the upper wall 11. In this connection, the upper end of the rod may be threaded to receive a nut 24 disposed in a pocket 25 of the upper end of the tank 10.

Positioned to extend into the outer electrode 18 in telescoping relationship is an inner electrode 30 of annular shape and preferably constructed as a sleeve. It cooperates with the outer electrode 18 in defining a radial space 31 and a communicating annular space 32 in which a main field may be established. It is shown as being of frusto-conical form, diverging downwardly at substantially the same angle as the outer electrode 18.

To support the inner electrode 30 in an adjustable manner with respect to the outer electrode 18, I prefer to utilize a cantilever construction with adjustments permitting both radial and circumferential adjustment of the inner electrode with respect to the vertical axis of the tank 10. The preferred construction is best shown in Figures 1, 2, and 3 in which the end of a rod 35 is bifurcated to provide portions which extend partially around the inner electrode 30 and which are suitably connected thereto as by welding. The other end of this rod 35 extends slidably into a sleeve 37 to permit adjustment of the radial position of the inner electrode 30. When in proper position, a set screw 38 is tightened to retain the adjustment.

That end of the sleeve 37 which is closest to the axis of the tank 10 is suitably connected to an adjusting means including a block 39. As shown, this block includes a pin 40 threadedly received by the sleeve 37 which is locked against turning by abutment with the block 39, or by auxiliary means. This block 39 is pivotally supported on a bolt 42 extending therethrough and also through a plate 43 of a supporting member 44. This permits sufficient circumferential adjustment of the inner electrode 30 to position it properly with respect to the outer electrode 18. When in proper position, a set screw 45 is threaded through the block 39 into engagement with the lower surface of the plate 43 to lock the structure in the desired position.

Extending upward from the supporting member 44 is a support 47 which, in turn, is suspended from a string of insulators 48. A rod 49 extending through a centralizing sleeve 50 secured to the upper wall 11 of the tank is used for suspending the string of insulators 48 and the attached electrode means. Vertical adjustment of the rod 49, and correspondingly the inner electrode 30, can be effected by turning a nut 51 toward the upper end of this rod.

The treating units 15' and 15" are of identical construction and the inner electrode 30' and 30" thereof are adjustably mounted by similar means. It will thus be apparent that the three inner electrodes 30, 30', and 30" are suspended from a single means comprising the support 47, the string of insulators 48, and the rod 49. These inner electrodes will thus be electrically connected together.

It will also be apparent that the outer electrodes 18', 18", and 18''' are individually suspended by means corresponding to the support 20, the string of insulators 22, and the rod 23. It is desirable that these outer electrodes be electrically connected together. Flexible conductors connecting the supports 20, 20', and 20" can be used in this connection, or, if the rigidity of the structure supporting the outer electrodes 18, 18', and 18" is to be increased, I can use rods 55, 55', and 55" interconnecting the supports 20, 20', and 20", as best shown in Figure 2. Adjustable spacing of these outer electrodes with respect to each other may be effected by threading the ends of these rods which extend through the arms of a U-shaped clamp 56 surrounding the corresponding support. These arms can thus be clamped against the support by tightening a pair of nuts 57 threaded to the end of the rod on opposite sides of these arms.

The proportioned amounts of oil and relatively fresh water can be delivered to the treating units 15, 15', and 15" by any suitable means. In the embodiment shown, a pump 60 continuously delivers the oil to a pipe 61 and a pump 62 is driven at proportional speed to force the relatively fresh water into the pipe 61 through a pipe 63. In this embodiment of the invention, a mingling of the oil and relatively fresh water is effected when the two liquids come together but, with many oils, it is desirable to avoid any semblance of intimate mixing at this point.

The pipe 61 extends upward to a distributor 64 with which discharge pipes 65, 65', and 65" are connected to distribute the proportioned amounts of oil and relatively fresh water to the three treating units. As shown, each of these pipes is bent upward to form a discharge means acting to discharge the proportioned materials into the inner electrode 30 in a direction toward the closure means of the outer electrode formed by the plate 19. It is preferable, though not always essential, to extend this discharge means slightly into the space defined by the inner electrode, though the amount of this inner extension is not critical. It is desirable to terminate the discharge means at such point that the incoming proportioned materials will exert an injector action tending to draw already-treated constituents into an annular space 66 between the discharge means and the inner electrode 30, as indicated by arrows 67.

To energize the electrodes, I prefer to use a system which establishes a potential difference between the inner and outer electrodes and a potential difference between the inner electrode and its corresponding discharge pipe. Fields of different voltage gradient can thus be established in a manner to minimize short-circuiting tendencies and facilitate the treatment which takes place concurrently with the turbulence-induced mixing action which may be set up in either or both of these fields.

In this connection, I have shown a double-transformer system including transformers 75 and 76. The secondary windings of these transformers are connected together and to ground through a conductor 77, being thus connected to the tank 10, which is grounded as indicated at 78. The remaining high-voltage terminal of the transformer 75 is connected by a conductor 79 extending through a bushing 80 to the support 47 and thus to each of the inner electrodes 30, 30', and 30". The remaining high-voltage terminal of the transformer 76 is connected to a conductor 82 which extends through a bushing 83 and is connected to the supports 20, 20', and 20" so as to energize the outer electrodes 18, 18', and 18". The primary windings of the transformers 75 and 76 are connected to a suitable source in such manner that the secondary potentials are additive. Thus, the potential between the outer electrode 18 and the inner electrode 30 will be represented by the sum of the voltages of the transformers 75 and 76. On the other hand, the potential between the inner electrode 30 and the discharge pipe 65 will be only one-half of this total potential if identical transformers are used. Correspondingly, the voltage gradient in the annular space 32 will be materially higher than in the space 66 between the discharge pipe 65 and the inner electrode 30.

The preferred mode of operation of the treater is a continuous one. The mingled oil and relatively fresh water, respectively delivered by the pumps 60 and 62 in proportioned amounts, represent the incoming constituents and are delivered upward through passage 84 of the inner electrode toward the plate 19 of the outer electrode at a considerable velocity. As the upward-moving stream nears this plate, it spreads and a turbulence is established near the plate which is of sufficient intensity to mix the constituents. Projection of such a stream into contact with a surface transverse to the direction of flow will establish a turbulence sufficient for the purpose disclosed and will also permit this surface to be energized by a field-producing means so that the mixing and coalescing actions are both present in the same zone. Contributing to this turbulence-produced mixing is the fact that the fluid does not move through a streamlined passage but rather through a tortuous passage so that the constituents are swirled in a manner to create eddies which effect a substantial mixing action. Another feature contributing to intimacy of mixing is the fact that the constituents substantially reverse their direction of movement, moving upward first inside the inner electrode and then moving downward in the annular space 32. The turbulence is most pronounced in the zone adjacent the annular upper edge of the inner electrode 30. In effect, the constituents substantially reverse their direction of flow as they move around this edge and are subjected to the high-gradient electric field formed between this edge and the elements of the outer electrode 18.

By proper design, another expedient can be used to facilitate mixing in the electric field, namely, vibration of one or both of the electrodes of each treating unit. This vibration can be induced by external or internal forces. It will be clear that both the inner and outer electrodes of the embodiment shown will have a tendency to vibrate. For example, the high-velocity stream discharging upward from the discharge pipe 65 and contacting the plate 19 of the outer electrode will tend to vibrate this electrode. The degree of vibration can be controlled, or practically eliminated if desired, by controlling the resiliency of the means supporting and interconnecting the outer electrodes. For example, the support 20 can be made smaller to increase the vibration. Likewise, the rods 55 can be made smaller or replaced with flexible conductors if a large amount of vibration is desired. In addition, the cantilever support for the inner electrodes may be of such resiliency that the incoming stream will vibrate these electrodes. If vibration is relied upon in whole or in part to induce the mixing action, this vibration should be at a relatively rapid rate. However, in many instances it is not essential to use the expedient of vibration for inducing the mixing action as entirely satisfactory results can be obtained through turbulence.

However, some turbulence is also present inside the inner electrode 30 in the passage 84 and this turbulence can also be made to effect a mixing action of the constituents while under the influence of the lower-gradient field established therein. In some instances, it is desired to establish a substantial mixing action in this passage 84 so that both coalescing and mixing tendencies are present in this field as well as in the annular space 32. Under such circumstances, some mixing of the constituents can take place in the lower-gradient field after which passage of the constituents over and around the annular edge of the inner electrode may establish sufficient turbulence to re-mix, in a degree, these constituents. In other instances, the mixing action in this lower-gradient field can be made quite small so that the predominance of mixing takes place adjacent the plate 19 while under the influence of the field thereadjacent.

By proper design, the constituents moving through the discharge pipe 65 can be made to draw into the inner electrode 30 certain already-treated constituents, as indicated by the arrows 67. These treated constituents will comprise mainly a treated and purified oil with some water dispersed therein, this water having been formed by coalescing some of the original impurity-containing droplets with the relatively fresh water and thus containing more of the impurities than are present in the relatively fresh water discharging upward from the discharge pipe 65. It will be clear, however, that the water droplets present in the recycled constituents contain impurities in quite small concentrations so that the impurities therein will be much more diluted than in the original impurity-containing droplets present in the incoming oil. By way of example, if the relatively fresh water is quite free of the impurities to be removed and is used in amount about 15% by volume of the incoming oil, it will be clear that, if this incoming oil contains one-half of 1% of water, even a complete coalescence of these original water droplets with the relatively fresh water will result in very low concentrations.

The relative amounts of oil and water present in the recycled constituents can be determined by proper selection of the vertical position of the treating units 15, 15', and 15" with respect to the tank 10. It will be clear that this tank contains substantially dry oil at its upper end and a body of water at its lower end, the upper surface of this body of water being approximated by the dotted line 87. The water content progressively decreases from the line 87 to the top of the tank 10. Such a positioning of the treating units 15 is used as will insure that the recycled constituents shall not be of a character tending to short-circuit the electrodes. At the same time, it is neither essential nor desirable that the recycled material should be exclusively oil. The presence of the water droplets therein appears to be beneficial in the process and makes available, in the passage 84 inside the inner electrode 30, three types of water droplets which may coexist and be mixed until coalesced by the action of the electric field. In this connection, it will be clear that the constituents in the passage 84 may comprise (1) the oil entering through the discharge pipe 65, (2) the oil which is recycled, as indicated by the arrows 67, (3) the impurity-containing water present in the oil to be treated and which is moved upward from the discharge pipe 65, (4) the relatively fresh water discharging upward from the pipe 65, and (5) the already-treated water representing a treated constituent entering the passage 66, as indicated by the arrows 67. These constituents are mixed in the space 84, as previously mentioned, and also in the space between the inner and outer electrodes.

However, it is not essential in all instances to recycle any substantial portion of the treated constituents. The feature of inducing a mixing action while the constituents are under the influence of an electric field is of value regardless of whether the constituents are recycled. In addition, the treater of the invention is well adapted to the treatment of emulsions or mixtures other than those which involve the addition of relatively fresh water. Even crude oil emulsions, as produced from a well, or other water-in-oil mixtures or emulsions may be very effectively treated by moving them into the pipe 61. In this instance, the treater will act to coalesce the dispersed water droplets of the emulsion, reducing the water content of the separated oil moving through the pipe 13 to 3% or less.

In carrying out the purification process involving the addition of relatively fresh water, it will be found that best results will be obtained if the incoming constituents are at an elevated temperature. Temperatures from 120° F. up to the boiling point of water at the pressure existing in the tank 10 can be used, this pressure being commonly from 10-50 lbs./sq. in. Temperatures are commonly from 130° F. to 190° F., though the process can be less effectively used on certain oils even if the temperature of the constituents is below 100° F.

The amount of relatively fresh water is not extremely critical, but it will be found that each oil treats best, with a maximum removal of the impurities, if a given amount of water is used. This amount is usually not less than 8% and the maximum amount of water is determined by the tendency to form reverse-phase mixtures which have a short-circuiting tendency, this upper limit being usually around 50% though, with some oils, about 20% is the upper limit. In most instances, the material delivered through the discharge pipe 65 will contain from 10% to 25% of the relatively fresh water with entirely satisfactory results. The best proportions within these ranges can be determined empirically.

The electrically-treated constituents separate in the tank 10. The coalesced water masses drop downward to the body of water beneath the level 87 and unite therewith. By proper operation of the treater, the stream of oil-free water can be withdrawn continuously through the pipe 14. The purified oil withdrawn from the upper end of the tank 10 usually contains an amount of water commensurate with the amount of water present in the oil advanced by the pump 60, though this is not an invariable rule as the process can be used to increase slightly, or decrease slightly, the amount of water. However, the water remaining in the oil withdrawn from the upper end of the tank 10 through the pipe 13 comprises predominantly droplets of the relatively fresh water, as distinct from droplets of the original water containing the impurities to be removed. In effect, the process removes such impurity-containing water droplets and replaces them with a more or less commensurate amount of relatively fresh water.

By way of example, the process and apparatus herein-disclosed has been found excellent in removing salt and other impurities from dehydrated crude oils. In one instance, it has been capable of continuously handling an incoming oil which was very difficult to treat by other electrical apparatus. This oil contained about .8% of brine and about 200 grams of salts per barrel of oil, mostly calcium chloride and sodium chloride. Six treaters of the type herein-disclosed were found successful in handling the supply of this oil, each treater receiving about 1500 barrels of oil per day of 24 hours. About 12% of relatively fresh water was used in this installation and the salt content of the treated oil was reduced to about 10 grams per barrel.

Referring particularly to Figure 4, the modification therein-shown can be used if it is desired that contact between the oil and relatively fresh water is to be effected closer to the treating unit than is possible in the form shown in Figure 1. By use of the modified structure, the oil and relatively fresh water can be brought into contact for the first time at a point adjacent the electric field.

In this modification, the outer electrode is indicated by the numeral 118 and is closed by a plate 119. As shown, this outer electrode is cylindrical in shape, as is also the inner electrode indicated by the numeral 130. This expedient can be used in the treater shown in Figure 1 without departing from the spirit of the invention, and causes the incoming stream to turn back upon itself to discharge vertically downward from the annular space 132.

The discharge means in this embodiment comprises inner and outer pipes or conduits 135 and 136 cooperating in defining an annular space 137 which is fed through a pipe 138 from a distributor 139. The inner pipe 135 extends through a gland 140 to a distributor 141. This inner pipe 135 can terminate at or near the top of the pipe 136.

The oil and relatively fresh water are delivered separately to the distributors 139 and 141 by pipes 142 and 143. Correspondingly, concentric streams of the relatively fresh water and the oil are delivered into the interior of the inner electrode 130. I prefer to move the relatively fresh water through the annular space 137 and the oil through the pipe 135, but the opposite system can be used without departing from the spirit of the invention. The inner and outer pipes 135 and 136 preferably terminate inside the inner electrode 130 in such position that a portion of the treated constituents is recycled. If it is desired that the first contact of the oil and relatively fresh water should be a slight distance from the field, the pipe 135 can be shortened to terminate near the gland 140, in which event the streams of oil and relatively fresh water will mingle when brought into contact in the pipe 136.

Only one treating unit is shown in Figure 4 but it will be clear that additional treating units can be fed from the distributors 139 and 141. The system shown in Figure 1 is contemplated for energization of the electrodes of Figure 4.

This application is a division of my application Serial No. 229,933, filed September 14, 1938.

Various changes and modifications can be made without departing from the spirit of the invention as defined in the appended claims.

I claim as my invention:

1. In combination in an electric purification system: electrode means defining a treating zone; means for establishing an electric field in said treating zone of sufficient intensity to coalesce the water droplets of a water-in-oil dispersion when present therein; a pair of conduits discharging into said treating zone; deflecting means in said treating zone and in the path of discharge from said conduits; and proportioning means for delivering proportional amounts of oil and water to said conduits for discharge into said treating zone against said deflecting means with sufficient velocity to subject the oil and water to a high degree of turbulence and intermix the oil and water in the treating zone while under the influence of said electric field, the electrically-treated constituents moving from said field and separating into bodies of oil and water.

2. An electric treating unit comprising: an inner electrode of annular shape open at its ends; an outer electrode of annular shape disposed around at least a portion of said inner electrode and cooperating therewith in defining an annular space therebetween; deflecting means extending across one end of said outer electrode; discharge means for introducing a stream comprising oil and water into one end of said inner electrode in a direction toward said deflecting means with sufficient velocity to cause said stream to move from the other end of said inner electrode and be deflected abruptly outward with substantial turbulence by said deflecting means, the discharge opening in said discharge means being smaller in size than the opening in said one end of said inner electrode whereby said stream moves through said inner electrode and then into and through said annular space between said electrodes in a direction having a component of motion substantially opposite the direction of discharge of said stream from said discharge means, said inner electrode being spaced from said discharge means to provide a passage into said one end of said inner electrode between said discharge means and said inner electrode; and means for electrically insulating said inner and outer electrodes from each other to permit establishment of a field-producing potential therebetween.

3. A combination as defined in claim 2 including means for electrically insulating said discharge means from said inner electrode, and including means for establishing a potential difference between said electrodes and between said inner electrode and said discharge means.

4. A combination as defined in claim 2 in which said discharge means includes means extending a distance into said inner electrode, and including means for establishing a potential difference between said electrodes and between said inner electrode and said means extending thereinto.

5. A combination as defined in claim 2 including a resilient cantilever support for said inner electrode whereby said inner electrode is vibrated by the action of said stream discharged thereinto by said discharge means.

6. A combination as defined in claim 2 including means for retaining a body of liquid around said electric treating unit in open communication with that end of said inner electrode into which said discharge means projects said stream and in open communication with the end of said annular space remote from said deflecting means whereby the stream exerts an injector action drawing a portion of said liquid into said inner electrode to be mixed with said oil and water constituents of said stream and to be moved through said annular space and to be discharged into said body of liquid.

7. An electric treating unit comprising: an inner electrode in the form of a sleeve; an outer electrode of inverted cup shape including a side wall and a deflecting means; means for mounting said outer electrode to telescope partially with said inner electrode to form a radial space between the end of said inner electrode and said deflecting means of said outer electrode and a longitudinal space around said inner electrode and between this electrode and said side wall of said outer electrode, said mounting means including means for insulating said electrodes from each other; and jet means discharging a relatively high velocity liquid stream into said inner electrode in a direction toward said deflecting means for deflection thereby in such manner as to establish a turbulence thereadjacent and for drawing liquid into said inner electrode from a position at that end thereof into which said jet discharges whereby said liquid and the jetted liquid mix and move through said radial space and thence through said longitudinal space to be acted upon by electric fields established in said spaces when said electrodes are energized.

8. An electric treating unit adapted to be positioned in an oil environment of a tank and including in combination: an inner electrode of frusto-conical sleeve shape open at its ends, the larger end being lowermost and open to said oil environment and the upper smaller end providing an annular edge; an outer electrode of inverted cup shape and comprising a frusto-conical wall diverging downward around but spaced from said sleeve electrode and a deflecting means extending across the opening at the small end of said frusto-conical wall, said deflecting means being spaced from the smaller end of said inner electrode; means for insulating said electrodes from each other to permit establishment of fields in the space between said frusto-conical portions of said electrodes and between said annular edge of said inner electrode and said deflecting means; and means for jetting liquid to be treated upward at relatively high velocity into the interior of said inner electrode as a stream of smaller diameter than the opening in said larger end of said inner electrode for turbulence-producing deflection thereof by said deflecting means to cause said liquid to flow around said annular edge and downward through said space between said frusto-conical portions of said electrodes.

9. In an electric treating unit for treating mixtures of immiscible liquids, the combination of: a plate; a pair of conduits directed toward said plate; proportioning means for delivering streams of dissimilar liquids under pressure to said conduits to jet said streams against said plate to mix said streams, one of said streams being an oil-continuous liquid; and means including electrode means spaced from said plate to establish a coalescing electric field acting upon the mixture as it is formed.

10. An electric treating unit for treating mixtures of immiscible liquids comprising: inner and outer telescopically arranged members defining a tortuous passage comprising a mixing zone; a pair of conduits directed into one end of said tortuous passage; a pair of pumps respectively delivering proportioned streams of liquid under pressure to said conduits to jet said streams into said tortuous passage with sufficient velocity to cause substantial turbulence and mix said liquids during passage therethrough; means for insulating said members from each other; and means for establishing an electric field in said tortuous passage.

11. An electric treating unit comprising: an inner electrode of annular shape; an outer electrode of annular shape disposed around said inner electrode; deflecting means extending across one end of said outer electrode; discharge means providing walls forming adjacent but separate passages, said discharge means being directed into said inner electrode in a direction toward said deflecting means; means for supplying oil to be treated to one of said passages and water to the other of said passages to produce streams of oil and water moving from said discharge means, said streams being deflected abruptly outward by said deflecting means to move into and through an annular space between said electrodes in a direction substantially opposite to the direction of discharge of said streams from said discharge means; and means for electrically insulating said inner and outer electrodes from each other to permit establishment of a field-producing potential therebetween.

12. An electric treating unit, comprising: a pair of nested electrodes comprising an outer annular electrode and a smaller inner annular electrode disposed concentrically about a common axis and spaced from each other to define an annular treating space, said inner electrode defining a passage providing open intake and discharge ends, the discharge end being within said outer annular electrode and communicating with said annular treating space; means for insulating said electrodes from each other to permit establishment of a potential difference therebetween sufficient to maintain a coalescing electric field in said treating space; jet discharge means having a discharge opening of smaller diameter than the opening in the intake end of said inner electrode directed axially into said intake end of said inner electrode and toward said discharge end thereof for delivering a stream comprising oil and water toward and from said discharge end, said inner electrode being spaced from said discharge means to provide a passage into said intake end between said discharge means and said inner electrode; and a turbulence-producing deflecting means carried by said outer annular electrode at a position beyond said discharge end of said inner electrode and in the path of flow of the oil and water moving from said discharge means to deflect same into said annular treating space to move' therealong in a direction having a component of motion opposite to the direction of jetting into said passage of said inner electrode.

13. In combination in an electrical purification system: an inner electrode of annular shape open at its ends; an outer electrode disposed concentrically around at least a portion of said inner electrode and cooperating therewith in defining an annular treating space; closure means extending across said outer electrode at a position beyond one of said open ends of said inner electrode; proportioning means for jetting proportioned amounts of oil and water into the interior of said inner electrode in a direction toward said closure means, said closure means deflecting said oil and water into said annular treating space and said proportioning means jetting the oil and water toward said closure means with sufficient velocity to establish a relatively high degree of turbulence upon such deflection by said closure means to intermix the oil and water, the intermixed oil and water moving through said treating space for coalescence of the water and discharging from said treating space, whereby the coalesced water separates from the oil upon discharge from said treating space.

14. In combination in an electrical purification system: an orifice means; proportioning means for delivering proportioned amounts of oil and water to said orifice means under sufficient pressure to discharge same at relatively high velocity in a given direction; a deflecting means in the path of travel of said water and oil to deflect same from said given direction with sufficient abruptness to subject said water and oil to substantial turbulence and intermix the oil and water; and means for establishing a coalescing electric field to act upon said oil and water during such intermixture thereof adjacent said deflecting means and during advancement of the deflected mixture while moving away from said deflecting means, said means including a first electrode spaced from said deflecting means to define a zone in which said deflection takes place, a second electrode electrically connected to said deflecting means and cooperating with said first electrode in defining a treating zone, and means for establishing a potential difference between said electrodes sufficient to establish said coalescing electric field.

EDMUND I. BAILEY.